(12) United States Patent
Bhalla et al.

(10) Patent No.: US 6,301,402 B1
(45) Date of Patent: Oct. 9, 2001

(54) CONTROL ARRANGEMENT FOR OPTICAL MECHANICAL SWITCHES

(75) Inventors: Kulbir Singh Bhalla, Red Bank; Albert Maxwell Gottlieb, Maplewood, both of NJ (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/517,700

(22) Filed: Mar. 2, 2000

(51) Int. Cl.$^7$ ........................................................ G02B 6/26
(52) U.S. Cl. .................. 385/16; 385/17; 385/18; 385/19; 385/24; 359/128
(58) Field of Search ................... 385/16–18, 19, 385/21, 24, 37; 359/128, 127, 130, 175, 139

(56) References Cited

U.S. PATENT DOCUMENTS 6,205,267 * 3/2001 Aksyuk et al. ........................... 385/19
6,222,954 * 4/2001 Riza ......................................... 385/18

* cited by examiner

Primary Examiner—Hemang Sanghavi
(74) Attorney, Agent, or Firm—Wilford L. Wisner

(57) ABSTRACT

An arrangement and a method for monitoring and controlling an optical mechanical switch, which may include one or more microelectromechanical switches. In communication using the arrangement or the method, independently of any customer signal, a modulated optical signal is generated at wavelengths, both modulation and optical, that are out-of-band with respect the wavelengths of any transmission signals that may appear. The modulated optical signal is directed toward the optical mechanical switch, and system control parameters are changed to maximize a detected signal after passage through the optical mechanical switch. Any remnants of the modulated optical signal may be removed before arriving at any customer-related terminal. Optical cross-connect switching circuits are exemplary circuits in which the invention may be applied. The modulated optical signal is inserted before or during the transmission of any transmission signal. If accomplished before the transmission of any customer signals, the relevant switch control parameter is dithered by a servo system to increase the amplitude of the detected signal. During the transmission of signals to a customer terminal, a less obtrusive change of a switch control parameter is employed. In either case, the detected signal is used in a servo system to reduce system loss. Since the monitoring and control signals are at known levels, the needed dynamic range for the detector is much reduced.

6 Claims, 2 Drawing Sheets

CONTROL ARRANGEMENT FOR OPTICAL MECHANICAL SWITCHES

TECHNICAL FIELD

This invention relates generally to the field of optical switching and in particular to arrangements and methods for monitoring and control of optical mechanical switches and switching systems.

BACKGROUND OF THE INVENTION

Optical mechanical switches such as microelectromechanical switching devices have become increasingly used for applications for which no comparable non-mechanical electronic device is available. Even for switching applications for optical communication, telemetry, and information processing systems, for which non-mechanical electronic switching devices do exist, a need for augmented capabilities is frequently met by optical mechanical switching devices.

For both microelectromechanical switches (MEMS) and other optical mechanical switches, a need exists for monitoring and improving their performance. At present this need typically is addressed by monitoring a customer's signals traveling through the system. Since a customer's signals frequently have a very large dynamic range, this technique requires the use of detectors with a dynamic range at least as large. A further drawback is that this technique requires a customer's signals to be present. Such signals are available only after a cross-connect has been provided. If the service provider chooses to modulate the customer's signals to ease design of the detection circuit, other problems, such as noise, result. Even the DC signals used by some providers are susceptible to, and may cause, noise.

Accordingly, improved monitoring techniques are urgently needed.

SUMMARY OF THE INVENTION

According to the invention, the performance of an optical mechanical switch is monitored independently of the presence of any customer signal.

According to a feature of the invention, a modulated optical signal is generated at a wavelength that is out-of-band with respect to the wavelengths of any transmission signals that may appear. The modulated optical signal is directed toward the optical mechanical switch, and system control parameters are changed to maximize a detected signal at the output of the optical mechanical switch.

Advantageously, any remnants of the modulated optical signal may be removed before arriving at any customer-related terminal. Optical cross-connect switching circuits are exemplary circuits in which the invention may be applied.

According to a preferred implementation of the invention, the modulated optical signal is inserted before or during the transmission of any customer signal. If accomplished before the transmission of any customer signals, the relevant switch control parameter is dithered in order to maximize the amplitude of the detected signal. During the transmission of customer signals, a less obtrusive change of a switch control parameter is employed. In either case, the detected signal is used in a servo system to reduce system loss. The preferred implementation includes a rotatable mirror as component, or central operator, on an optical mechanical switch fabric.

Further advantageously, since input monitoring and control signals are at known levels, the needed dynamic range for the detector is much reduced.

According to a further aspect of the invention, a method for monitoring and controlling an optical mechanical switch includes the steps of generating a modulated optical signal at a wavelength that is out-of-band with respect to the wavelengths of transmission signals that may pass through the optical mechanical switch, routing the modulated optical signal toward the optical mechanical switch to be rerouted by the optical mechanical switch toward an output port, detecting at the output port a modulation signal of the modulated optical signal, and changing a property of the optical mechanical switch to increase an amplitude of the detected modulation signal.

Further features and advantages of the invention will become apparent from the following description.

BRIEF DESCRIPTION OF THE DRAWING

The teachings of the present invention can be readily understood by considering the following detailed description in conjunction with the accompanying drawings, in which.

DETAILED DESCRIPTION

A preferred implementation of the various features of the invention will now be described while referring to FIGS. 1 and 2.

Figure 1:
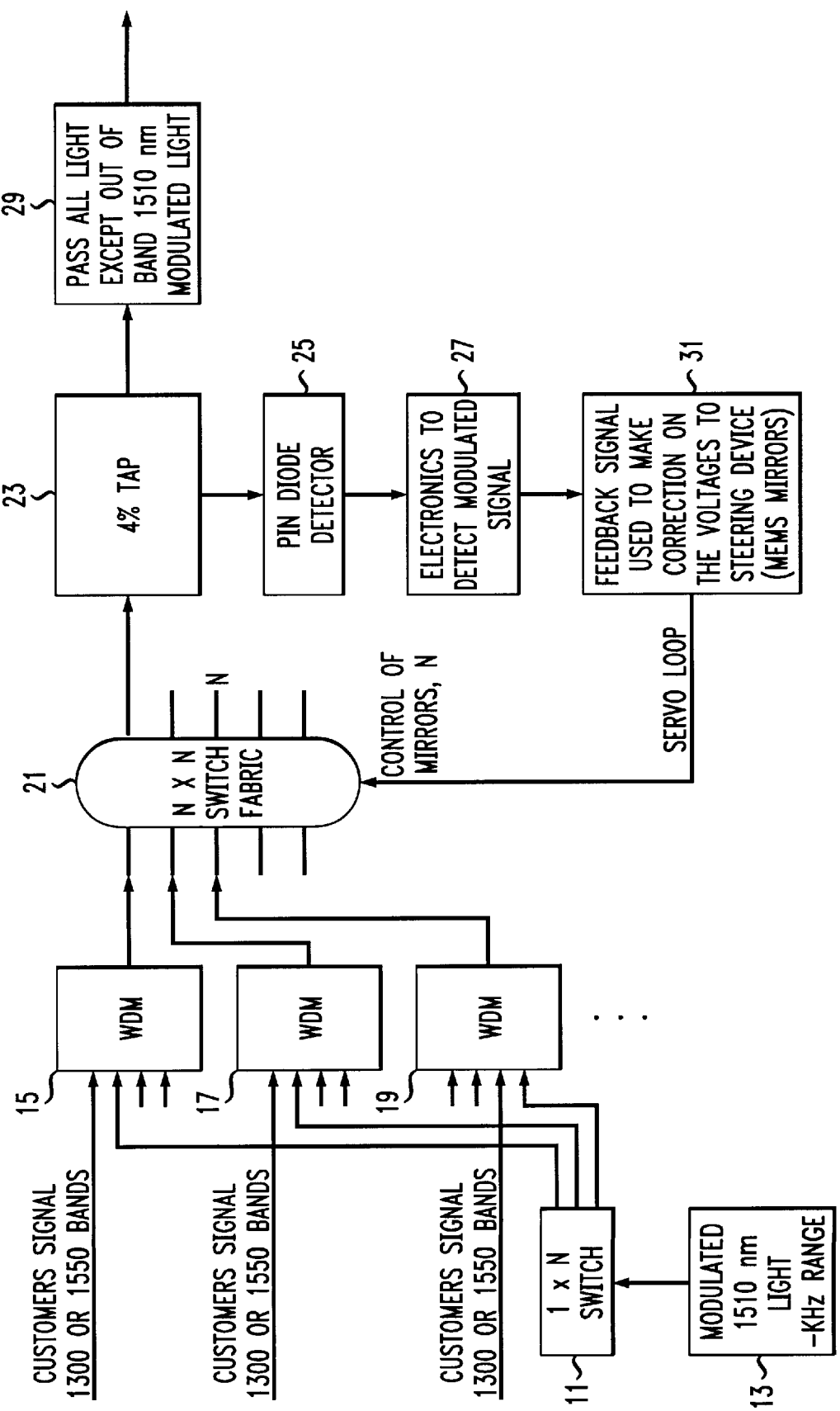
FIG. 1 is a block diagrammatic implementation of a preferred embodiment of the invention.

In FIG. 1, an optical switch 11 directs modulated light signals to appropriate ones of N different ports, occupied by N respective wavelength division multiplexers, of which wavelength division multiplexers 15, 17, and 19 are representative. Each can receive a plurality of input signals as well as the indicated customer optical band signals.

The outputs of wavelength division multiplexers 15, 17, and 19 are coupled to respective inputs of a switch fabric 21 to further direct the wavelength division multiplexed signals to a suitable matrix of output paths. Note that if optical switch 11 were, for example, a rotatable mirror that can direct a light beam from one input to N output positions, then as a related example, switch fabric 21 could be N mirrors arranged to direct the input light beams to an N×N matrix of output paths. Other examples are known and are feasible.

Signals to be transmitted between customers are provided in the 1300 nm. or 1550 nm. optical bands. As shown, some of them are applied to the wavelength division multiplexers 15, 17, and 19 via paths other that those through optical switch 11.

Illustratively, during a time period when the in-band 1300 nm. or 1550 nm. signals are not being transmitted through switch 11, an out-of-band test signal, for example, a 1510 nm. optical signal, modulated in the low kiloHertz range or lower, is applied from a signal generator 13 to switch 11. This signal is out-of-band both optically with respect to the aforesaid customer optical bands and base-band-wise with respect to the customer modulation signals.

At each of the outputs of switch fabric 21, a conventional 4% tap 23 sends a portion of the signal to a PIN diode detector 25 of conventional type. Pin diode detector 25 converts optical power to electrical current. The frequency band of modulation of the test signal is separated from the frequency bands of other detected signals in electronics 27, is amplified, and then is sent to an analog-to-digital converter. (See FIG. 2, to be described in more detail hereinafter.) The remaining 96% of each signal is passed through filter 29, which passes all light except the out-of-band 1510 nm. modulated light. For example, the latter light is sent to an absorbing termination (not shown).

The detected modulation from the out-of-band light signal is applied from electronics 27 to a servo circuit 31 that is a system controller. It acts on switch fabric 21 to change one of its properties. For example, for each channel that has a control signal, one pair or more of mirrors are moved to tend to increase the amplitude of the detected signal of electronics 27. Ultimately, a maximization of the signal occurs, with concurrent optimization of the performance of switch fabric 21.

The feedback of servo circuit 31 in the servo loop of the system controller to switch fabric 21 includes control signals for each channel upon which switch 11 acts. Each channel having a control signal can also receive a plurality of input transmission signals.

In the preferred implementation, optical mechanical switch fabric 21 is an array of microelectromechanical switches (MEMS), each mounted in a suitable enclosure (not shown) with an input port at which at which a respective one of wavelength division multiplexers 15, 17, and 19 is mounted, and directs its output beam toward an operative element of the electromechanical switch. For example, two microelectromechanical mirrors are pivotally mounted and electrically driven so that they can direct any of the light beams toward selected ones of the output ports. Details of mounting such microelectromechanical mirrors and techniques for electrically driving them can be found in our copending patent application, Ser. No. 09/400,719, filed Sep. 21, 1999, and assigned to the assignee hereof. For example, each mirror can be mounted on torsional spring elements attached to opposite sides of the mirror and can be electrically driven through capacitive electrode plate elements, at least one of which is plated on the back of the mirror.

The method of the arrangement of FIG. 1, according to the invention, is described in more detail with reference to FIG. 2.

Figure 2:
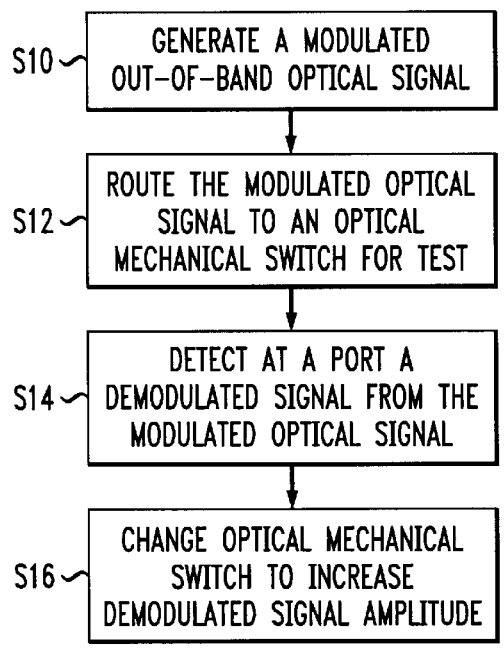
FIG. 2 is a block-diagrammatic showing of a preferred method of the invention.

In the method of FIG. 2, step S10 generates an out-of-band light beam at 1510 nm. from a generator 13, such as a laser or parametric oscillator, and modulates it at 10 kilohertz in a lithium niobate optical modulator. Step S12 routes the out-of-band modulated light beam to optical switch 11. This step can be done simply by mounting generator 13 on the input port of switch 11. Step S14 detects at a port the modulation that was imposed upon and injected with the out-of-band optical signal. The port, illustratively at the output of PIN diode detector 25, may be considered an extension of an output port of switch 11 through one of the wavelength division modulators 15, 17, and 19 and through switch fabric 21, tap 23, and diode 23. Step S 16 changes the optical switch fabric 21 in the appropriate sense to increase the detected amplitude at electronics 27. Illustratively, in the absence of transmission signals between customers, the rotation of a MEMS in switch 11 is dithered about a gradually changing midpoint to discover any possible increase in the detected signal at electronics 27. In fact, electronics 27 can control the change in the midpoint of the dither.

All of the parameters of the foregoing descriptions are illustrative only and can readily be changed, so long as they remain within the capabilities of electronics 27.

Figure 3:
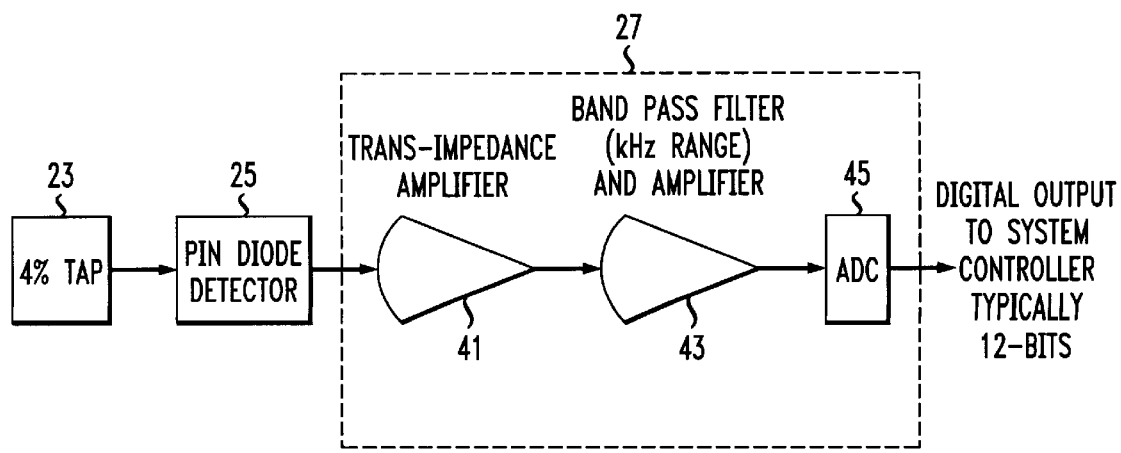
FIG. 3 is a block-diagrammatic showing of particular electronics of FIG. 1.

In FIG. 3, electronics 27 is shown in block diagrammatic form. Pin diode detector 25 is connected to trans-impedance amplifier 41 in electronic 27. Trans-impedance amplifier 41 is connected to bandpass filter and amplifier 43, which filters in the kHz range. Bandpass filter and amplifier 43 to analog-to-digital converter 45. Analog-to-digital converter 45 provides, illustratively, a twelve-bit (12-bit) digital out to system controller 31.

With adequate filtering capabilities in bandpass filter and amplifier 43 and in circuit 29 (FIG. 1), it is apparent that the arrangement and method of the invention include implementations in which the text signal is used during communications between customers. Illustratively, a parameter of the optical mechanical switch fabric is varied to improve system performance without using a dither.

It should be apparent that the foregoing implementation can be modified without departing from the spirit and scope of the invention, as determined by the following claims and their equivalents.

The claimed invention is:

1. An arrangement for monitoring and controlling an optical mechanical switch, comprising:

means for generating a modulated optical signal at a wavelength that is out-of-band with respect to the wavelengths, both modulation and optical, of transmission signals that may pass through the optical mechanical switch;

means for routing the modulated optical signal toward the optical mechanical switch to be rerouted by the optical mechanical switch toward an output port;

a detector optically coupled to the output port to detect a modulation signal of the modulated optical signal; and means for changing a property of the optical mechanical switch to increase the detected modulation signal.

2. The arrangement according to claim 1, wherein the means for routing the modulated optical signal comprises means for routing the modulated optical signal toward the optical mechanical switch in the absence of transmission signals; and the means for changing a property of the optical mechanical switch includes means for dithering the property to attain an increase of the detected modulation signal.

3. The arrangement according to claim 2, further including a plurality of output ports in addition to the aforesaid output port, and wherein the optical mechanical switch comprises a rotatable mirror, the mirror being adapted to direct the transmission signals to the plurality of outputs and to the aforesaid output port, the mirror, the plurality of output ports, and the aforesaid output port comprising an optical cross-point switching circuit, and the means for changing a property comprising a servo system for changing the rotation of the mirror to increase the amplitude of the detected signal.

4. A method for monitoring and controlling an optical mechanical switch, comprising the steps of:

generating a modulated optical signal at wavelengths, both modulation and optical, that are out-of-band with respect to the wavelengths of transmission signals that may pass through the optical mechanical switch;

routing the modulated optical signal toward the optical mechanical switch to be rerouted by the optical mechanical switch toward an output port;

detecting at the output port a modulation signal of the modulated optical signal; and changing a property of the optical mechanical switch to increase an amplitude of the detected modulation signal.

5. The method according to claim 4, wherein the step of routing the modulated optical signal comprises the step of routing the modulated optical signal toward the optical mechanical switch in the absence of transmission signals; and the step of changing a property of the optical mechanical switch includes the step of dithering the property to attain an increase of the detected modulation signal.

6. The method according to claim 5 implemented in an optical cross-point switch including a rotatable mirror as the optical mechanical switch, the aforesaid output port being one of a plurality of output ports of the optical crosspoint switch, wherein the step of changing a property of the optical mechanical switch comprises the step of servoing the rotation of the mirror to increase the amplitude of the detected signal.

* * * * *